May 20, 1947.   H. L. BAKER   2,420,766
SECTION MOLD
Filed Sept. 20, 1943
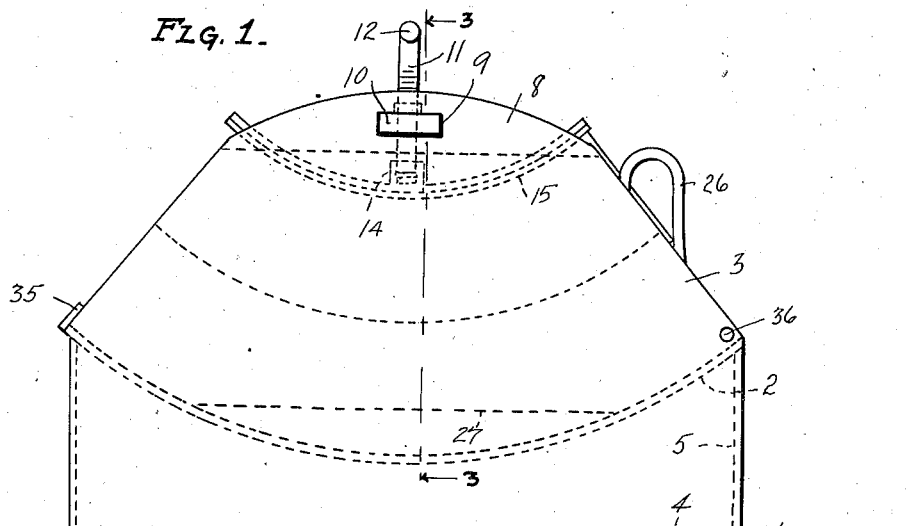
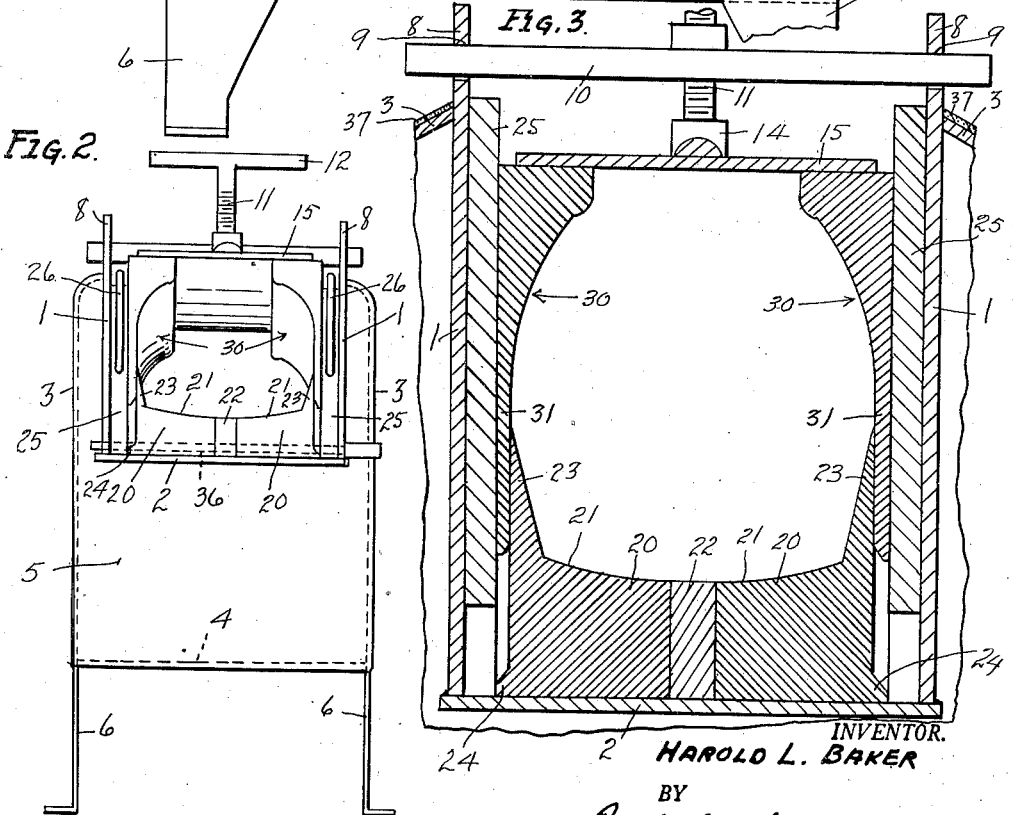
INVENTOR.
HAROLD L. BAKER
BY
Boykin Mohler & Beckley
ATTORNEYS.

Patented May 20, 1947

2,420,766

UNITED STATES PATENT OFFICE 2,420,766

SECTION MOLD

Harold L. Baker, Clovis, Calif.

Application September 20, 1943, Serial No. 503,079

9 Claims. (Cl. 18—18)

This invention relates to section tire molds on vulcanizers, and is an improvement of the invention disclosed in my application for United States Letters Patent, Serial No. 354,811, now Patent No. 2,330,329.

Several of the main objects of this invention are: the provision of simple and economical structure for adjusting the mold to take various sized tire casings; the provision of simple and economical means for releasably locking tread plates, and side spacer-plates in a mold and for handling the side spacer-plates; the provision of means for positioning the tread plates in the mold to insure proper spacing for the side wall plates relative to the tread plates; the provision of economical and rugged structure for removably and adjustably supporting the top plate in the mold cavity and over the bead portion of a section of casing to be held in the cavity for vulcanizing.

Other objects and advantages will appear in the drawings and description.

In the drawings,

Fig. 1 is a side elevational view of a section mold of this invention.

Fig. 2 is an end view of the mold of Fig. 1.

Fig. 3 is an enlarged fragmentary sectional view taken along line 3—3 of Fig. 1 showing a pair of side spacer-plates, the main side wall plates, the tread plates and a tread plate spacer, all in position in the mold cavity or channel, the latter being also shown in section, as well as the top plate.

In detail, the section mold virtually comprises an inner, upwardly opening channel having parallel side walls 1 and a bottom 2, said bottom being curved longitudinally of the channel with the concave side of the curve facing the open upper side of the channel. This bottom wall is straight transversely and is disposed at right angles to the side walls. The curvature of said bottom in direction longitudinally of the channel is approximately the same as the curvature of the tread portions of tire casings, circumferentially thereof, and sections of which are to be vulcanized in said mold.

The above described inner channel is spaced within an outer channel having side walls 3 and a bottom 4, to provide a steam chamber outside said walls 1, 2. The side walls 3 of the outer channel are respectively bent inwardly along their upper edges toward the walls 1 respectively adjacent thereto, and the said upper edges are welded to walls 1. The bottom 4 of the outer channel extends upwardly at its ends as at 5 (Fig. 1) and the ends 5 are welded to the ends of bottom 2, thus forming a steam-tight and water-tight chamber between the inner and outer channels, in substantially the same manner as in my aforesaid application for patent.

The side walls 3 of the outer channel are preferably extended downwardly at their ends to provide legs 6 for supporting the mold horizontally. The usual pressure gage and relief valve and water inlet (not shown) may be provided for said chamber, and any type of heat may be used for heating water in the chamber for generating steam therein, or steam may be conducted thereto from a separate boiler.

The walls 1 of the inner channel are extended upwardly above the upper edges of walls 3 to provide upwardly projecting opposed ears 8 (Fig. 1). Coaxial openings 9 are formed in said ears respectively for receiving therein the end portions of a cross bar 10.

The bar 10 is provided with an interiorly threaded through opening intermediate its ends for threadedly supporting a vertical screw 11 that has a handle 12 at its upper end for turning the screw.

The lower end of screw 11 is rotatably held in a socket member 14 that is secured to the upper concave side of a longitudinally curved top plate or strip 15 at a point intermediate the ends of said plate. The curve of the top plate 15 follows a line generated substantially about the same center as the curve of bottom 2, since said top plate substantially follows the circumferential contour of the bead portions of a tire to be held in said mold.

The width of the top plate 15 is less than the space between the walls 1 so as to permit lateral adjustment of the top plate, and also so that said plate and bar 10 can be quickly removed from the mold, either for positioning a tire section in the mold, or for replacing the top plate with one of a different curvature, if so desired. By moving bar 10 longitudinally thereof until one of the lateral edges of the top plate is substantially against one of the sides 1 of the inner channel, one of the ends of said bar will move out of one of the openings 9, and then by tilting said bar and top plate, the other end of the bar is readily removed from the other opening 9 and the bar and plate are clear of the mold. The screw 11 is used for moving the top plate against the radially inner sides of the bead portions of the tire that is to be placed in the mold and against the side wall plates, as will later be described. The top plate is preferably reinforced by a central rib extending longitudinally thereof, as illustrated in the drawings.

In adjusting the mold for a tire casing, the right sized tread plates are positioned on the bottom 2. These tread plates comprise a pair of complementarily formed elongated members 20 that extend from end to end of the inner channel of the mold. They are longitudinally curved so that their radially outer sides correspond to the curvature of the bottom 2, while their generally radially inner sides are curved to correspond to the circumferential curvature of the tread and shoulder of the casing to be repaired. Each of the tread plates is formed with a radially inwardly facing side 21 (Fig. 3) that may be curved to correspond with the transverse contour of the tread portion of said casing, and if the tire is relatively large in its cross-sectional dimension, an arcuate spacer plate 22 may be positioned between the tread plates. Each tread plate is preferably formed with a radially inwardly projecting flange 23 along their sides that are outermost, the opposed sides of which flanges extend divergently away from the surfaces 21, while the said opposite outermost sides of the plates, including the outer sides of the flanges 23 are straight and parallel with the walls 1 respectively adjacent each tread plate, except for a laterally outwardly projecting ridge 24 adjacent the radially outer sides of said tread plates. These ridges 24 are of equal thickness so as to constitute spacers of practically the same thickness as the side wall portions of side wall plates to be described.

The above description of the tread plates is the same for practically any set of such plates, but in those cases where a smaller sized tire is to be repaired, I provide a pair of vertical spacer plates 25 that are adapted to be positioned adjacent walls 1 respectively, either before or after the tread plates are in the mold. The ridges 24 will engage said spacer plates when the latter are used, and if desired, additional spacer plates may be positioned between each plate 25 and the side wall 1 adjacent thereto.

Each of said spacer plates 25 is formed with end edges that extend convergently upwardly from the edges that are supported on bottom 2, and which edges generally follow about the same lines as the end edges of the side walls 1. On one of the said end edges of each plate 25 is a handle 26 that is about co-planar with each plate, and which handle projects outwardly of the mold for grasping by the hand of an operator for pulling the plate out of the mold. The lower edge of each spacer plate is centrally straight as along line 27 (Fig. 1) and only the end portions of said lower edge are curved to correspond to the curvature of bottom 2. Thus an operator may pull each spacer plate out longitudinally thereof and of the mold channel without difficulty, as the edge 27 will slide on the end of the channel bottom upon such movement, whereas a full arcuate movement of said spacer plates would otherwise be necessary in order to remove them from the mold. Also the top edge of each spacer plate may be straight and parallel with edge 27.

The space provided between the opposite outermost sides of the pair of tread plates and the spacer plates, or between the said sides of the pair of tread plates and walls 1 when the spacer plates are not used, is for receiving the lower edges of the side wall portions of the side wall plates.

The side wall plates 30 comprise a pair having lower side wall portions 31 (Fig. 3) that are of uniform thickness adapted to slide toward and away from the ridges 24 and between the tread plates and the spacer plate or channel wall 1 adjacent thereto. Each side wall plate is segmental in shape, similar to each side wall 1, except that the radially inner (upper) edge of each side wall plate is parallel with the top plate 15. The opposed inner sides of the side wall plates are formed in cross-sectional contour to follow the cross-sectional contour of the casings adjacent the beads, and all the way to the radially inwardly facing sides of the bead portions. The radially inwardly (upwardly) facing edges of the side wall plates are relatively wide and are adapted to be engaged by the convex downwardly facing side of the top plate 15 along its edges (Fig. 3).

One end of bottom 2 of the inner channel of the mold is extended upwardly and parallel with the end edges of sides 1 adjacent thereto to form a lip 35 as best seen in Fig. 1. When the tread plates 20, tread spacer 22, and side spacer 25, and any other side spacer plates that may be used are in the mold, their end edges adjacent the lip 35 are engaged by said lip and the ends of the plates adjacent the lip must be pulled away from said lip in order to be lifted from the mold.

The sides 1 of the inner channel adjacent the bottom 2 and at the end of the bottom opposite lip 35 have coaxial openings therein and each of the tread plates 20, tread spacers 22, and side spacer plates 25, and any other side spacer plates are formed with openings in alignment with the said openings in said side plates when said tread plates and spacers are in position with one of these ends held by lip 35. A removable rod 36 extending through said aligned openings releasably secures said tread plates and spacers in the mold channel. This is an important feature of the invention.

By using the ears 8 of side walls 1 for holding the top plate in the mold against the pressure of the conventional bag used inside the tire casing, an extremely strong and simple structure is provided, and by providing the spacer ridges 24 on the tread plates, there can be no binding of the side wall plates 30. The spacer plates 25 are quite frequently replaced in a mold during a day's work without necessarily changing all of the other parts, and handles 26, together with the straight lower edge 27 of each plate, greatly facilitate this work. The releasable locking of the tread plates and various spacers in the mold channel prevents any misadjustment and facilitates using the mold as though these various plates were integral therewith.

The side walls 3 and end walls 5 are covered with any suitable heat insulation material 37 (Fig. 3), such as asbestos.

Having described my invention, I claim:

1. A section mold having parallel side walls and a bottom wall extending at right angles thereto forming a channel for receiving therein a section of a tire casing; a pair of tread plates respectively supported on said bottom wall adjacent said side walls; a pair of opposed side-spacer plates positioned against said side walls respectively and extending between said tread plates and said side walls; said side-spacer plates having opposed sides, a pair of side wall plates respectively against the opposed sides of said side-spacer plates; means directly engaging said tread plates and said side-spacer plates removably securing them in said channel against said bottom.

2. A section mold having parallel side walls and a bottom wall extending at right angles thereto forming a channel for receiving therein a section of a tire casing; a pair of tread plates respectively supported on said bottom wall adjacent said side walls; a pair of opposed side-spacer plates positioned against said side walls respectively and extending between said tread plates and said side walls; said side-spacer plates having opposed sides, a pair of side wall plates respectively against the opposed sides of said side-spacer plates; means directly engaging said tread plates and said side-spacer plates removably securing them in said channel against said bottom; said means comprising a rod removably extending through coaxial openings formed in said tread plates, side-spacer plates and side walls at one of the ends of said channel.

3. A section mold having parallel side walls and a bottom wall extending at right angles thereto forming a channel for receiving therein a section of a tire casing and a removable top plate for closing the open side of said channel; a pair of tread plates respectively supported on said bottom wall adjacent said side walls; a pair of opposed side-spacer plates positioned against said side walls respectively and extending between said tread plates and said side walls; means directly engaging said tread plates and said side-spacer plates removably securing them in said channel against said bottom independently of said top plate; a pair of side wall plates respectively positioned against the opposed surfaces of said side-spacer plates; said side wall plates being free from said means for movement relative to said side-spacer plates and tread plates in a direction outwardly of said channel; and a portion of each of said side wall plates extending between said respective tread plates and the side wall adjacent thereto.

4. A section mold having parallel side walls and a bottom wall extending at right angles thereto forming a channel for receiving therein a section of a tire casing and a removable top plate for closing the open side of said channel; a pair of tread plates respectively supported on said bottom wall adjacent said side walls; a pair of opposed side-spacer plates positioned against said side walls respectively and extending between said tread plates and said side walls; means directly engaging said tread plates and said side-spacer plates removably securing them in said channel against said bottom independently of said top plate; a projection formed on each of said tread plates adjacent said bottom wall spacing the latter from said side-spacer plates respectively; and a side wall plate slidably extending into the space between each of said tread plates and the side-spacer plate adjacent thereto, said side wall plates being movable relative to said side-spacer plates and said tread plates.

5. A section mold having parallel side walls and a bottom wall extending at right angles thereto forming a channel for receiving therein a section of a tire casing; a pair of tread plates respectively supported on said bottom wall adjacent said side walls; a pair of opposed side-spacer plates positioned against said side walls respectively and extending between said tread plates and said side walls; said side-spacer plates having opposed sides, a pair of side wall plates respectively against the opposed sides of said side-spacer plates; means directly engaging said tread plates and said side-spacer plates removably securing them in said channel against said bottom; a handle on one of the ends of each of said side-spacer plates projecting from said channel to facilitate removal of said side-spacer plates from said channel.

6. A section mold having vertical parallel side walls and a bottom wall extending at right angles thereto forming an upwardly opening channel for receiving a section of a tire casing; a pair of side-spacer plates respectively adjacent said side walls and parallel therewith; said spacer plates having opposite end edges extending convergently upwardly from the ends of said bottom wall; tread molding means on said bottom wall between said side-spacer plates; means formed on one end of said bottom wall extending over one of the said convergent end edges of said side-spacer plates for preventing vertical movement of the ends of said side-spacer plates adjacent said means; the said side walls and said side-spacer plates being formed with coaxial openings at the ends of said channel opposite said means, and a rod removably extending through said openings.

7. A section mold having vertical parallel side walls and a bottom wall extending at right angles thereto forming an upwardly opening channel for receiving a section of a tire casing; a pair of side-spacer plates respectively adjacent said side walls and parallel therewith; said spacer plates having opposite end edges extending convergently upwardly from the ends of said bottom wall; means formed on one end of said bottom wall extending over one of the said convergent end edges of said side-spacer plates for preventing vertical movement of the ends of said side-spacer plates adjacent said means; the said side walls and said side-spacer plates being formed with coaxial openings at the ends of said channel oposite said means, and a rod removably extending through said openings; tread plates on said bottom wall engaged at one of their ends by said means, and openings formed in the opposite ends of said tread plates coaxial with the openings in said spacer plates for receiving said rod.

8. In a section mold having vertical parallel side walls and a bottom wall extending at right angles thereto forming an upwardly opening channel for receiving a section of a tire casing; a pair of side-spacer plates respectively adjacent said side walls and parallel therewith; said spacer plates having opposite end edges extending convergently upwardly from the ends of said bottom wall; means formed on one end of said bottom wall extending over one of the said convergent end edges of said side-spacer plates for preventing vertical movement of the ends of said side-spacer plates adjacent said means; the said side walls and said side-spacer plates being formed with coaxial openings at the ends of said channel opposite said means, and a rod removably extending through said openings; a handle formed on each of said side-spacer plates projecting from the end edges thereof that are adjacent said rod to facilitate end movement of said plates out of said channel upon removal of said rod.

9. A section mold having parallel side walls and a bottom wall forming a channel for receiving therein a section of a tire casing, elongated tread plates supported on said bottom wall, means respectively at opposite ends of said tread plates for securing said tread plates against said bottom wall, the said means at one of said ends being coaxial, horizontally aligned through openings in said tread plates and in said side walls and a rod slidably extending through said openings, the said means at the ends of said tread plates opposite said rod being a lip rigid with said bottom wall extending over the latter ends of said tread plates.

HAROLD L. BAKER.

REFERENCES CITED

The following references are of record in the file of this patent:

UNITED STATES PATENTS

| Number | Name | Date |
|---|---|---|
| 1,928,404 | Woock et al. | Sept. 26, 1933 |
| 2,185,543 | Daniel | Jan. 2, 1940 |
| 2,330,329 | Baker | Sept 28, 1943 |
| 1,875,727 | Heintz | Sept 6, 1932 |
| 1,914,474 | Woock et al. | June 20, 1933 |
| 2,315,770 | Cleveland | Apr. 6, 1943 |
| 2,088,026 | Daniel | July 27, 1937 |